United States Patent [19]

Rittmann

[11] Patent Number: 4,982,612

[45] Date of Patent: Jan. 8, 1991

[54] TORQUE WRENCH WITH MEASUREMENTS INDEPENDENT OF HAND-HOLD POSITION

[75] Inventor: Nancy C. Rittmann, Racine, Wis.

[73] Assignee: Snap-on Tools Corporation, Kenosha, Wis.

[21] Appl. No.: 252,659

[22] Filed: Oct. 3, 1988

[51] Int. Cl.⁵ .............................................. B25B 23/142
[52] U.S. Cl. .............................. 73/862.23; 73/862.26
[58] Field of Search .................... 81/479, 478, 467; 73/862.23, 862.26, 862.65, 862.35, 862.67; 177/211, 229

[56] References Cited

U.S. PATENT DOCUMENTS

| | | |
|---|---|---|
| 2,174,356 | 9/1939 | Zimmerman . |
| 3,858,444 | 1/1975 | Wallace . |
| 3,895,517 | 7/1975 | Otto . |
| 3,995,477 | 12/1976 | Almond ........................ 73/862.26 X |
| 4,006,629 | 2/1977 | Barrett et al. . |
| 4,055,080 | 10/1977 | Farr et al. . |
| 4,073,187 | 2/1978 | Avdeef . |
| 4,244,213 | 1/1981 | Marcinkiewicz . |
| 4,257,263 | 3/1981 | Herrgen . |
| 4,281,538 | 8/1981 | Dudek . |
| 4,333,220 | 6/1982 | Aspers . |
| 4,397,196 | 8/1983 | Lemelson . |
| 4,485,682 | 12/1984 | Stroezel et al. . |
| 4,522,075 | 6/1985 | Pohl . |
| 4,544,039 | 10/1985 | Crane . |
| 4,620,449 | 11/1986 | Borries et al. . |
| 4,864,841 | 9/1989 | Heyraud ........................ 73/862.26 X |

*Primary Examiner*—Charles A. Ruehl
*Attorney, Agent, or Firm*—Emrich & Dithmar

[57] ABSTRACT

A torque measuring wrench includes a deflection beam provided with a socket head at one end and having a region of reduced cross-sectional area. Four strain gauges are mounted on the beam and connected in a measuring bridge, with one gauge disposed at the region of reduced cross-sectional area and the other gauges disposed closer to the ratchet head. A tubular handle is connected to the othe end of the beam and encloses battery-powered control circuit including indicating means. The torque wrench measurements are independent of the position along the handle at which the force is applied by the user.

18 Claims, 2 Drawing Sheets

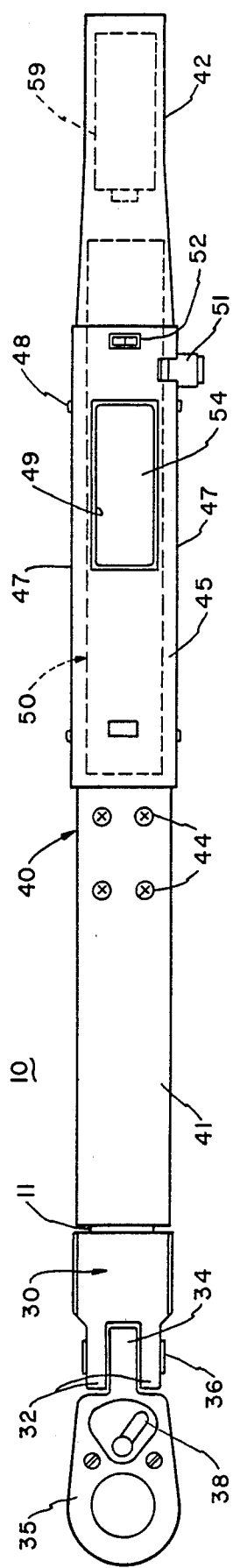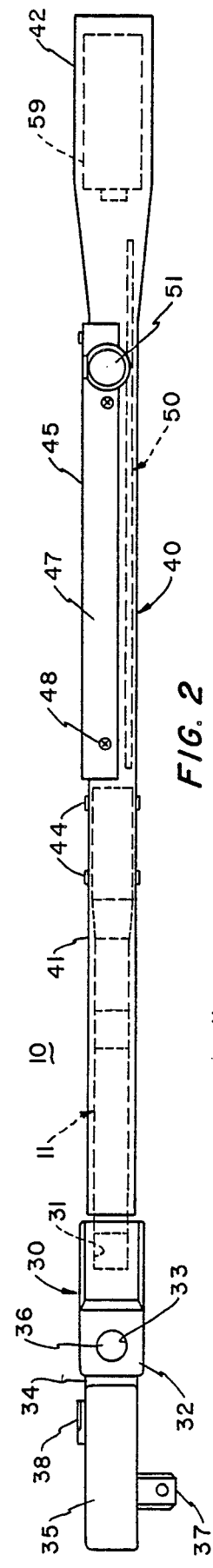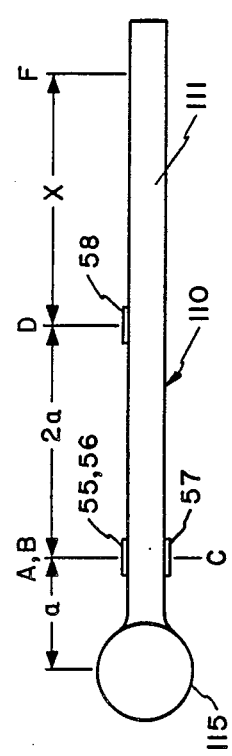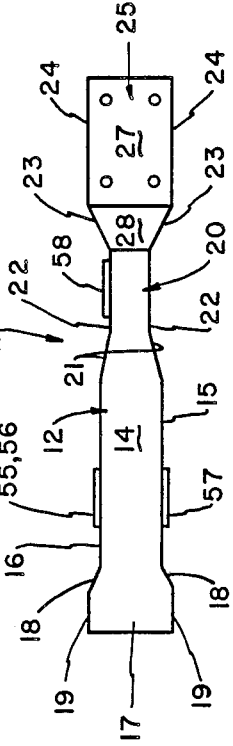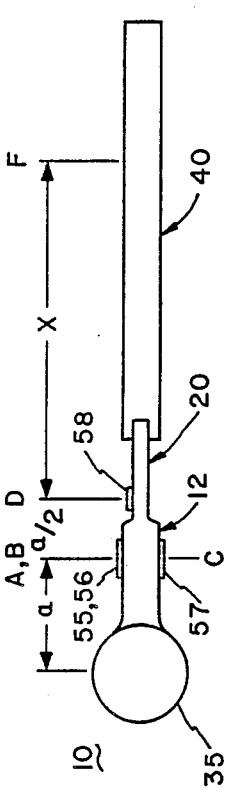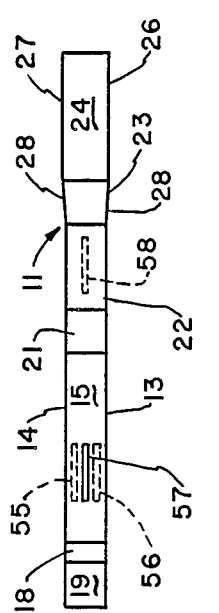
FIG. 1
FIG. 2
FIG. 3
FIG. 4
FIG. 5 PRIOR ART
FIG. 6

TORQUE WRENCH WITH MEASUREMENTS INDEPENDENT OF HAND-HOLD POSITION

BACKGROUND OF THE INVENTION

1. Field of the Invention

The present invention relates to torque wrenches of the type which include electronic means for measuring torque applied to a structure in response to application of force to the wrench by the operator.

2. Description of the Prior Art

Torque wrenches of the electronic type typically include an elongated deflection beam provided at one end with a head portion for coupling to an associated structure, such as a threaded fastener or the like, and provided at the other end with an elongated handle. Strain gauges are disposed on the deflection beam to measure the strain or deflection of the beam in response to forces applied to the handle by the operator in torquing the threaded fastener. Typically, the strain gauges are connected in an electronic circuit which produces an indication of the torque applied to the fastener as a function of the measurements made by the strain gauges.

The deflection beam is typically an elongated rectangular or cylindrical bar and a common arrangement utilizes four strain gauges connected in a Wheatstone bridge network. It is known that if these four gauges are arranged on the beam so that three of them are disposed at a first distance "a" from the coupling head, with two gauges on one side of the beam and another gauge on the opposite side of the beam, and the fourth gauge is disposed on the one side of the beam at a distance 3a" from the coupling head, the torque measurement will be independent of the position along the handle at which the force is applied by the operator, as long as that position is not closer to the coupling head than the fourth strain gauge. This is obviously a particularly advantageous arrangement, since it permits an operator to operate the wrench without being concerned as to the placement of the operator's hand on the handle.

In torque wrenches having a flex ratchet type coupling head, the strain gauges must be disposed away from the coupling head. Thus, the minimum value of the distance "a" in this arrangement is limited by the physical design of the wrench and the coupling head, and typically necessitates that the fourth strain gauge be disposed at a relatively large distance from the coupling means. Normally, additional length is needed to accommodate the associated electronic circuitry and, therefore, the foregoing arrangement may result in an inconveniently long torque wrench.

U.S. Pat. No. 4,006,629 to Barrett et al. discloses a torque wrench having four strain gauges arranged in a bridge network and all disposed on a reduced-thickness portion of the deflection beam of the wrench. The patent discloses that this arrangement can be utilized to produce torque measurements independent of the user's hand-hold position, but it necessitates that the strain gauges have different sensitivities or gauge factors.

SUMMARY OF THE INVENTION

It is a general object of the present invention to provide an improved torque measuring wrench which avoids the disadvantages of prior wrench constructions while affording additional structural and operating advantages.

An important feature of the invention is the provision of a torque measuring wrench which produces torque measurements independent of the user's hand-hold position while accommodating a reduced overall wrench length and permitting the use of off-the-shelf strain gauges having the same gauge factor.

In achieving the foregoing feature, it is another feature of this invention to provide a torque measuring wrench of the type set forth which utilizes a deflection beam of variable transverse cross section, with gauges respectively located at regions of different cross section.

These and other features of the invention are attained by providing a torque measuring wrench for measuring the torque applied to a structure comprising: an elongated deflection beam having coupling means at one end thereof for engagement with the associated structure and having handle means at the other end thereof, gauge means for measuring and indicating torque applied to the associated structure at the coupling means in response to a force applied to the handle means, the gauge means including a plurality of strain gauges having substantially the same gauge factor disposed along the beam and connected in a measuring bridge, and means associated with one of the strain gauges for weighting the output thereof differently from the outputs of the other ones of strain gauges.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 is a top plan view of a torque measuring wrench constructed in accordance with and embodying the features of the present invention;

FIG. 2 is a side elevational view of the torque measuring wrench of FIG. 1;

FIG. 3 is a top plan view of the deflection beam of the torque measuring wrench of FIG. 1;

FIG. 4 is a side elevational view of the deflection beam of FIG. 3;

FIG. 5 is a diagrammatic view of a prior art torque measuring wrench;

FIG. 6 is a diagrammatic view, similar to FIG. 5, of the torque measuring wrench of the present invention.

DESCRIPTION OF THE PREFERRED EMBODIMENT

Figure 7:
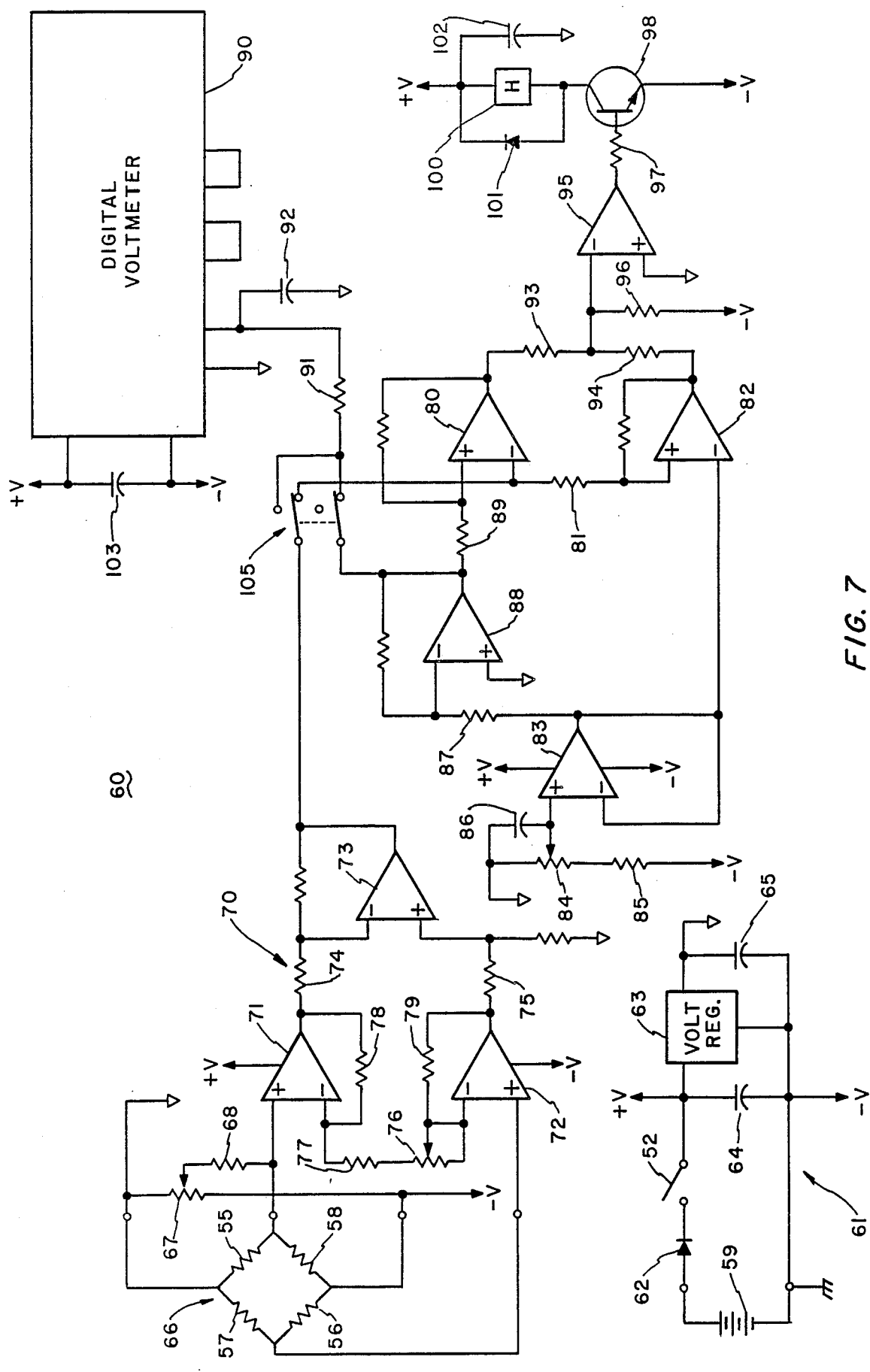
FIG. 7 is a schematic circuit diagram of the control circuitry for the torque measuring wrench of FIG. 1.

Referring now to FIGS. 1 through 4, there is illustrated a torque measuring wrench, generally designated by the numeral 10, constructed in accordance with and embodying the features of the present invention. The wrench 10 includes an elongated deflection beam 11 which is substantially rectangular in transverse cross section along its entire length. The beam 11 includes an elongated shank 12 having flat parallel front and rear surfaces 13 and 14 interconnected by opposed side surfaces 15 and 16 which are parallel to each other and perpendicular to the front and rear surfaces 13 and 14. The shank 12 is coupled to a widened coupling portion 17 by means of inclined shoulders 18 which respectively connect the side surfaces 15 and 16 to substantially parallel side surfaces 19 on the widened coupling portion 17. The deflection beam 11 includes a necked-down portion 20 at the other end thereof having opposed side surfaces 22 which are respectively coupled by inclined shoulders 21 to the side surfaces 15 and 16 of the shank 12. At the other ends thereof, the side surfaces 22 are respectively coupled by inclined shoulder surfaces 23 to the substantially parallel side surfaces 24 of a thick mounting portion 25. The mounting portion 25 has parallel front and rear surfaces 26 and 27 which are perpendicular to and interconnected by the side surfaces 24. The front and rear surfaces 26 and 27 are spaced apart a distance greater than the distance between the front and rear surfaces 13 and 14 of the shank 12 and are respectively connected thereto by inclined transition surfaces 28.

The wrench 10 also includes a yoke 30, provided with a socket 31 dimensioned for receiving snugly therein the widened coupling portion 17 of the deflection beam 11 in press-fitted relationship. The yoke 30 is also provided with a pair of clevis legs 32 having coaxial holes 33 formed therethrough (one shown) and adapted to receive therebetween the tongue 34 of a ratchet head 35. A pivot pin 36 is received through the holes 33 and through a complementary hole in the tongue 34 (not shown) for securing the ratchet head 35 to the yoke 30. The ratchet head 35 includes a lug 37, typically of square cross section, adapted to be fitted into a socket wrench tool in a known manner. Preferably, the ratchet head 35 is provided with a direction control lever 38 for reversing the ratcheting direction of the head 35 in a known fashion.

The wrench 10 is also provided with a handle assembly 40 which includes an elongated tubular body 41 generally rectangular in transverse cross section and provided with an end portion 42 which is of reduced width side-to-side, but of increased depth front-to-back. The tubular body 41 is dimensioned to be slidably telescopically fitted over the thick mounting portion 25 of the deflection beam 11 and to be securely fastened thereto by a plurality of fasteners 44. Preferably, the parts are assembled so that the entire length of the shank 12 of the deflection beam 11 is received within the tubular body 41, as illustrated in FIGS. 1 and 2. Since the mounting portion 25 is thicker and wider than the shank 12 of the deflection beam 11 there is clearance between the shank 12 and the inner surface of the tubular body 41 to accommodate strain gauge sensors and deflection of the beam, as will be explained more fully below.

The front wall of the tubular body 41, between the end portion 42 thereof and the attachment to the deflection beam 11, is provided with a rectangular cutout (not shown) which is covered by a channel-shaped cover plate 45. The cover plate 45 is provided at the opposite side edges thereof with side flanges 47 which respectively overlap the side walls of the tubular body 41 and are fixedly secured thereto, as by fasteners 48. The cover plate 45 is also provided with a smaller rectangular cutout 49 therein (see FIG. 1).

Disposed within the tubular body 41 beneath the cover plate 45 is a printed circuit board 50. Carried by the circuit board 50 is an adjustment knob 51 which projects outwardly of the handle assembly 40 through complementary apertures in the tubular body 41 and the cover plate 45. Also carried by the circuit board 50 is an ON-OFF switch 52 which projects through the cutout in the tubular body 41 and through a complementary aperture in the cover plate 45. A digital display 54 is mounted on the circuit board 50 and is disposed in registry with the cutout 49 in the cover plate 45 for viewing by the operator.

Four strain gauges 55, 56, 57 and 58, preferably of the resistance type and having substantially the same gauge factor, are mounted on the deflection beam 11 and are electrically connected to circuitry on the circuit board 50. As can best be seen in FIGS. 3 and 4, the strain gauges 55-57 are all disposed at the same distance from the end of the deflection beam 11, with the strain gauges 55 and 56 being disposed on the side surface 16 and the strain gauge 57 being disposed on the opposite side surface 15. The strain gauge 58 is disposed on the side surface 22 of the necked-down portion 20 of the deflection beam 11 on the same side as gauges 55 and 56. Disposed in the hollow end 42 of the tubular body 41 is a battery 59 for powering the circuitry of the wrench 10.

Referring now to FIG. 7, there is illustrated a control circuit 60 for the wrench 10, which circuitry is disposed on the circuit board 50, except for the strain gauges 55-58 and the battery 59, as explained above. The circuit 60 has a power supply 61 which includes a diode 62, the anode of which is connected to the positive pole of the battery 59 and the cathode of which is connected through the ON/OFF switch 52 to one terminal of a voltage regulator 63, a second terminal of which is connected to the negative pole of the battery 59. A capacitor 64 is connected across these two terminals of the voltage regulator 63, at which terminals are respectively produced +V and -V DC supply voltages. The voltage regulator 63 has a third ground terminal and a capacitor 65 is connected across this ground terminal and the -V terminal of the voltage regulator 63. Preferably, the power supply 61 is so arranged that the -V terminal produces a regulated output voltage which is 5 VDC below the voltage of the ground terminal, while there is produced at the +V terminal a non-regulated voltage which is above the level of the ground terminal.

The strain gauges 55-58 are connected in a Wheatstone bridge network, one input of which is connected to ground and the other input of which is connected to the -V supply. Connected across these input arms of the bridge network 66 is a potentiometer 67, the wiper of which is connected through a resistor 68 to one output arm of the bridge network 66. The potentiometer 67 is adjustable for zero balancing the bridge network 66 in the event that the strain gauges 55-58 may experience mounting imbalances or the like.

The output arms of the bridge network 66 are coupled to an instrumentation amplifier circuit, generally designated by the numeral 70, which is of conventional construction and includes three operational amplifiers 71, 72 and 73. The output arm of the bridge network 66 between the stain gauges 55 and 58 is connected to the non-inverting input terminal of the operational amplifier 71, while the other output arm of the bridge network 66 is connected to the non-inverting input terminal of the operational amplifier 72. The outputs of the operational amplifiers 71 and 72 are respectively applied through resistors 74 and 75 to the inverting and the non-inverting input terminals, respectively, of the operational amplifier 73. The inverting input terminals of the operational amplifiers 71 and 72 are interconnected by the series connection of a potentiometer 76 and a resistor 77, the wiper of the potentiometer 76 also being connected to the inverting input terminal of the operational amplifier 72. The outputs of the operational amplifiers 71 and 72 are respectively fed back to the inverting input terminals thereof through resistors 78 and 79.

The output of the instrumentation amplifier 70, which is the output of the operational amplifier 73, is connected through one pole of a double-pole, double-throw switch 105 to the inverting input terminal of a comparator 80 and, through a resistor 81, to the non-inverting input terminal of a comparator 82. The reference potentials for the comparators 80 and 82 are derived from a potentiometer 84, one terminal of which is connected to ground potential and the other terminal of which is connected through a resistor 85 to the −V supply. A capacitor 86 is connected across the wiper of the potentiometer 84 and the ground terminal. The wiper of the potentiometer 84, which is mechanically connected to the adjustment knob 51, is electrically connected to the non-inverting input terminal of an operational amplifier 83 which is connected as a voltage follower. The output of the operational amplifier 83 is fed back to its inverting input terminal and is also applied to the inverting input terminal of the comparator 82. This output of the operational amplifier 83 is also applied through a resistor 87 to the inverting input terminal of an inverting amplifier 88, the output of which is connected through a resistor 89 to the non-inverting input terminal of the comparator 80. The output of the inverting amplifier 88 is also applied to an input terminal of a digital voltmeter 90 through the other pole of the switch 105 and a resistor 91. This input of the digital voltmeter 90 is also connected to ground through a capacitor 92, which cooperates with the resistor 91 to provide noise filtering on the input of the voltmeter.

The outputs of the comparators 80 and 82 are, respectively, applied through resistors 93 and 94 to the inverting input terminal of an operational amplifier 95, which terminal is also connected through a resistor 96 to the −V supply. The output of the operational amplifier 95 is connected through a resistor 97 to the base of a transistor 98, the emitter of which is connected to the −V supply and the collector of which is connected to one terminal of a horn 100, the other terminal of which is connected to the +V supply. A diode 101 is connected across the terminals of the horn 100. A capacitor 102 is connected between the +V supply and ground. A capacitor 103 is connected across the +V and −V input terminals of the digital voltmeter 90.

In operation, when the ON-OFF switch 52 is closed, DC power is supplied to the circuit 60. The output signal from the bridge network 66 is amplified by the instrumentation amplifier 70 and applied to the comparators 80 and 82. It will be appreciated that when the bridge network 66 has been properly zero balanced, it will initially have a zero output if no force is being applied to the torque wrench 10. In use, the operator couples the ratchet head 35 to the socket device to be torqued, grasps the handle assembly 40 anywhere along the tubular sleeve 41 between the distal end thereof and the fasteners 44, and applies torque to the associated structure to be torqued. This causes stress in the deflection beam 11, resulting in a corresponding deflection or strain which is sensed by the strain gauges 55-58, changing the resistances thereof in proportion to the deflection at the location of the strain gauge. The circuitry is arranged so that if the torque wrench 10 is turned in a clockwise direction, as viewed in FIG. 1, it will produce a positive differential output voltage across the output arms of the bridge network 66, which in turn produces a positive output voltage at the output terminal of the instrumentation amplifier 70. Similarly, if the torque wrench 10 is rotated in a counterclockwise direction, the torque produced will generate a negative differential output voltage at the output arms of the bridge network 66, producing a negative output voltage at the output of the instrumentation amplifier 70.

The output of the instrumentation amplifier 70 is compared in the comparators 80 and 82, respectively, to positive and negative reference voltages which are derived from the operational amplifier 83. More specifically the negative output voltage of the operational amplifier 83 is applied directly as a negative reference voltage to the inverting input terminal of the comparator 82, and is applied through the inverting amplifier 88 as a positive reference voltage to the non-inverting input terminal of the comparator 80. The magnitude of this reference voltage is controlled by the adjustment of the potentiometer 84 by the adjustment knob 51. It will be noted that, with the switch 105 in its normal condition, illustrated in FIG. 1, the output of the inverter amplifier 88 is connected to the input of the digital voltmeter 90, which operates to convert this reference voltage level to a digital readout calibrated in units of torque. Thus, by adjustment of the potentiometer 84, the operator can dial in a preset reference voltage which corresponds to a reference torque anywhere between zero and the full scale torque value.

If the output from the instrumentation amplifier 70 exceeds the positive reference voltage level, the comparator 80 will produce an output signal which is, in turn, applied through the amplifier 95 to switch on the transistor 98, which operates as a inverting switch for driving the horn 100 and giving an audible indication that the preset torque value has been reached. Similarly, if a negative output from the instrumentation amplifier 70 exceeds the negative reference voltage of the comparator 82, it will produce an output signal, which again turns on the horn 100.

If the switch 105 is switched to its other position, the output of the inverting amplifier 88 will be disconnected from the digital voltmeter 90 and the output of the instrumentation amplifier 70 will be connected to the input of the digital voltmeter 90. Thus, in this alternate position of the switch 105, the voltmeter 90 will directly read, in footpounds, the torque being applied by the wrench 10, rather than displaying a preset reference torque level. In this mode, the operator simply monitors the display of the voltmeter 90 to observe the desired torque, and the horn 100 is disconnected. The location of the switch 105 on the wrench 10 is not illustrated in the drawings, since this is an optional feature. It will be appreciated that the circuitry could be hard-wired in either connection configuration of the switch 105 and the switch could be eliminated.

Referring now to FIG. 5, there is illustrated a prior art form of torque wrench, generally designated by the numeral 110, which includes a deflection beam 111 of substantially uniform cross section along its entire length, and provided at one end with a ratchet head 115. In the torque wrench 110, the strain gauges 55-58 are arranged generally in the same manner as they are in the torque wrench 10 described above. In the prior art arrangement of FIG. 5, it has been mathematically determined that if the distance of the strain gauge 58 from the axis of rotation of the ratchet lug is three times the distance "a" of the strain gauges 55-57 from that axis, then the wrench 110 will produce the same torque reading regardless of the position along the handle of the wrench 110 that the force F is applied by the operator, as long as it is applied somewhere between the strain gauge 58 and the handle end of the wrench. Since the distance "a" of the strain gauges 55-57 from the axis of rotation of the ratchet lug is determined by the structural characteristics of the ratchet head, therefore the minimal distance of the strain gauge 58 from that axis of rotation is also determined. In electronic strain gauges, where it is desirable to locate the electronic circuitry outboard of the strain gauge 58, this may result in an unacceptably long wrench.

In FIG. 6, the torque wrench 10 of the present invention is diagrammatically illustrated. In a preferred embodiment of the present invention, the distance "a" of the strain gauges 55-57 from the axis of rotation of the ratchet lug is the same is in FIG. 5. But in this case, since the strain gauge 58 is located on the necked-down portion 20 of the deflection beam 11, in a preferred embodiment of the invention, the strain gauge 58 may be disposed a distance of only 1.5"a" from the axis of rotation of the ratchet lug, instead of a distance of 3"a", as in the prior art device. It can be mathematically demonstrated that with this arrangement, the torque reading will be independent of the position at which the force F is applied to the handle assembly by the operator, if the width of the necked-down portion 20 is equal to the width of the shank 12 divided by the square root of two, i.e., the width of the shank 12 multiplied by 0.707, assuming the shank 12 and the necked-down portion 20 have the same thickness and are rectangular in transverse cross section. Thus, it can be appreciated that by the use of the present invention there is provided a torque wrench which produces torque readings which are independent of the handhold position of the operator (as long as hand-hold position is outboard of the strain gauge 58), and at which the distance between the outermost strain gauge 58 and the axis of rotation of the ratchet lug is only one-half that of the prior art device.

While a deflection beam 11 of rectangular cross section has been disclosed in the preferred embodiment of the invention, it will be appreciated that other cross-sectional shapes could be utilized. It has been found that, in the case where the strain gauges are arranged in the general configuration illustrated in FIGS. 3, 4 and 6, E is proportional to $T/Z_1$, where E is the output voltage from the bridge network 66, T is the torque delivered and $Z_1$ is the cross-section modulus of the deflection beam at the point where the strain gauges 55-57 are located. It has been found that $Z_2 = Z_1/2$, where $Z_2$ is the cross-section modulus of the necked-down portion 20 and $Z_1$ is the cross-section modulus of the shank 12. By calculation it can be found that $d_2 = 0.707 \, d_1$, where $d_2$ is the width of the necked-down portion 20 and $d_1$ is the width of the shank portion 12, assuming both portions have rectangular transverse cross sections of the same thickness.

These results are demonstrated below. Thus, where the locations of the strain gauges 55-58 along the deflection beam 11 are respectively designated A, B, C, and D, where the output voltage from the Wheatstone bridge 66 is E and where S is the stress in the deflection beam 11 at a particular location, and if it is assumed that the wrench 10 is calibrated so that E=0 when $S_A = S_B = S_C = S_D = 0$, then $$E\alpha(S_A + S_B - S_C - S_D) \quad (1)$$

It is known that:

$$S = M/Z \quad (2)$$

where Z is the section modulus and M is the moment at the section. It will be noted that since the strain gauges 55-57 are all located at the same distance from the axis of rotation of the ratchet lug, the locations A, B, C are the same, and shall arbitrarily be designated A. It is known that if the cross-section of the shank 12 has the same shape along its entire length, then $$Z_D = Z_A/N \quad (3)$$

where N is a constant which is 1 if the transverse cross sections are identical at A and D, and is other than 1 if the transverse cross sections at A and D are different.

Referring to FIG. 6, it can be seen from equations (2) and (3) that $$S_A = S_B = -S_C = M_A/Z_A = F(X+Ca)/Z_A, \quad (4)$$

where F is the force applied to the wrench by the operator and C is a constant. Similarly, it is seen that $$S_D = M_D/Z_D = M_D(N/Z_A) = F(X)(N)/Z_A. \quad (5)$$

Substituting equations (4) and (5) into equation (1):

$$E \, \alpha F/Z_A[(X+Ca)+(X+Ca)-(-)(X+Ca)-XN] \quad (6)$$

which reduces to:
$$E\alpha F/Z_A[X(3-N)+3\,Ca] \quad (7)$$

Since the torque applied at the ratchet lug 37 is equal to force times distance, then:

$$T = F[X+Ca+a], \quad (8)$$
or
$$F = T/[X+Ca+a] \quad (9)$$

Substituting equation (9) into equation (7), $$E\alpha T/Z_A \{[X(3-N)+3\,Ca]/[X+Ca+a]\} \quad (10)$$

From the size constraints for the wrench 10, a desirable distance between the locations A and D is a/2, whereby C=0.5. Therefore:

$$E\alpha T/Z_A \{[X(3-N)+3(0.5)a]/[X+0.5a+a]\}, \quad (11)$$

or $$E\alpha T/Z_A \{[X(3-N)+1.5a]/[X+1.5a]\}. \quad (12)$$

If N=2, then:

$$E\alpha T/Z_A, \quad (13)$$

which is not a function of X or hand-hold position. Thus, where the shank 12 has the same shape transverse cross section along its entire length, $$Z_D = Z_A/2 \quad (14)$$

In the case of a rectangular transverse cross section, where b is the uniform thickness of the beam and d is its width, it is known that $$Z = bd^2/6. \quad (15)$$

Thus, from equation (3)

$$(16) \ (d_D)^2 = (d_A)^2/N, \text{ and}$$

$$(17) \ d_D = \sqrt{1/N} \ (d_A).$$

Thus, where N=2

$$(18) \ d_D = \sqrt{\tfrac{1}{2}} \ (d_A) = .707 \ d_A.$$

Accordingly, in a constructional model of the invention, if the maximum width of the shank 12 is 0.75 inch, then the width of the necked-down portion 20 is 0.530 inch.

It will be appreciated that for other cross-sectional shapes or length requirements, the formula for the cross-section modulus for that shape can be utilized to derive the necessary relationship between the dimensions of the cross-section of the shank 12 and that of the necked-down portion 20.

From the foregoing, it can be seen that there has been provided an improved electronic torque measuring wrench, which produces torque measurements which are independent of the operator's hand-hold position, and yet which permit the strain gauges to be placed closer together than in prior wrenches, resulting in a reduction of the overall wrench length.

I claim:

1. A torque measuring wrench for measuring the torque applied to a structure comprising: an elongated deflection beam having coupling means at one end thereof for engagement with the associated structure and having handle means at the other end thereof, gauge means for measuring and indicating torque applied to the associated structure at said coupling means in response to a force applied to said handle means, said gauge means including a plurality of strain gauges having substantially the same gauge factor disposed along said beam and connected in a measuring bridge, at least one of said strain gauges being disposed at a first distance from said coupling means and at least one of said strain gauges being disposed at a second distance from said coupling means greater than said first distance, and means associated with each of said strain gauges disposed at said second distance for weighting the measurement thereby greater than the measurements by the ones of said strain gauges disposed at said first distance.

2. The torque measuring wrench of claim 1, wherein said gauge means includes four gauges arranged in a wheatstone bridge network.

3. The torque measuring wrench of claim 2, wherein three of said strain gauges are disposed at said first distance from said coupling means with two of said strain gauges disposed on one side of said deflection beam and the third strain gauge disposed on the opposite side thereof, the fourth one of said strain gauges being disposed on said one side of said deflection beam at said second distance from said coupling means.

4. The torque measuring wrench of claim 3, wherein the measurement by said fourth strain gauge is given twice the weight of the measurements by the other ones of said strain gauges.

5. The torque measuring wrench of claim 1, wherein said gauge means includes a battery power source.

6. The torque measuring wrench of claim 1, wherein said gauge means includes annunciator means for producing a signal when the torque applied to the associated structure exceeds a predetermined reference value.

7. A torque measuring wrench for measuring the torque applied to a structure comprising: an elongated deflection beam having coupling means at one end thereof for engagement with the associated structure and having handle means at the other end thereof, said beam having a region of reduced cross-sectional area, and gauge means for measuring and indicating torque applied to the associated structure at said coupling means in response to a force applied to said handle means, said gauge means including a plurality of strain gauges disposed along said beam and connected in a measuring bridge network with one of said strain gauges being disposed at said region of reduced cross-sectional area and others disposed outside said region of reduced cross-sectional area.

8. The torque measuring wrench of claim 7, wherein said deflection beam is substantially rectangular in transverse cross section.

9. The torque measuring wrench of claim 8, wherein said region of reduced cross-sectional area has a thickness substantially the same as that of the remainder of the deflection beam and a width which is substantially equal to the width of the remainder of the deflection, beam divided by the square root of two.

10. The torque measuring wrench of claim 8, wherein said gauge means includes four strain gauges, three of said strain gauges being disposed intermediate said coupling means and said region of reduced-sectional area and all at substantially the same distance from said coupling means with two of said strain gauges being disposed on one side of said deflection beam and the other strain gauge being disposed on the opposite side of said deflection beam.

11. The torque measuring wrench of claim 7, wherein said handle means includes an elongated tubular sleeve which receives said deflection beam therein and is fixedly secured to said other end thereof in a mounting configuration with said region of reduced cross-sectional area being disposed within said sleeve.

12. The torque measuring wrench of claim 7, wherein said gauge means includes means for comparing the torque applied to the associated structure to a predetermined reference level, and annunciator means for producing an indication when the measured torque exceeds said reference level.

13. The torque measuring wrench of claim 7, wherein said gauge means includes switch means operable between a first condition for producing a signal when the torque applied to the associated structure exceeds a predetermined reference level and a second condition for producing an indication proportional to the torque applied to the associated structure.

14. A method for measuring the torque applied to a structure in response to application of a drive force to an elongated deflection beam coupled to the structure, the method comprising the steps of: taking a plurality of measurements of the strain produced at different locations along the beam in response to application of the drive force, at least one of the measurements being taken at a first predetermined distance from the associated structure and at least one of the measurements being taken at a second predetermined distance from the associated structure greater than said first predetermined distance, weighting each of the strain measurements taken at the second predetermined distance greater than the strain measurements taken at the first predetermined distance, and combining all of the strain measurements in accordance with a bridge network to produce an output signal which is representative of torque applied to the structure and is independent of the location along the beam at which the drive force is applied.

15. The method of claim 14, wherein four of the strain measurements are taken, three of the strain measurements being taken at the first predetermined distance from the associated structure with two of the measurements taken on one side of the deflection beam and the other measurement taken on the opposite side thereof, the fourth one of the strain measurements being taken at the second predetermined distance from the associated structure.

16. The method of claim 14, wherein each of the measurements taken at the second predetermined distance is weighted by taking it at a region of reduced cross-sectional area along the deflection beam.

17. The method of claim 14, and further comprising the step of comparing the torque applied to the associated structure to a predetermined reference and producing an indication when the measured torque exceeds the reference.

18. The method of claim 14, wherein each of the measurements taken at the second predetermined distance is given a weight of twice the other measurements.

* * * * *